United States Patent [19]

Kaczur et al.

[11] Patent Number: 4,780,232

[45] Date of Patent: Oct. 25, 1988

[54] PROCESS FOR PREPARING SELECTED, DOPED MAGNETITE/CARBONATE CO-PRECIPITATES

[75] Inventors: Jerry J. Kaczur; Larry D. Carpenter, both of Cleveland, Tenn.

[73] Assignee: Olin Corporation, Cheshire, Conn.

[21] Appl. No.: 24,234

[22] Filed: Mar. 11, 1987

Related U.S. Application Data

[63] Continuation-in-part of Ser. No. 923,063, Oct. 24, 1986.

[51] Int. Cl.$^4$ ............... C01G 49/08; C04B 35/26; C04B 35/64
[52] U.S. Cl. ............... 252/62.59; 252/62.56; 252/62.62; 252/62.63
[58] Field of Search ............... 252/62.56, 62.6, 62.63, 252/62.59, 62.62; 427/215

[56] References Cited

U.S. PATENT DOCUMENTS

| | | | |
|---|---|---|---|
| 4,539,129 | 9/1985 | Nagai et al. | 252/62.63 |
| 4,565,726 | 1/1986 | Oguchi et al. | 252/62.63 X |
| 4,582,623 | 4/1986 | Kubo et al. | 252/62.63 X |
| 4,585,568 | 4/1986 | Nagai et al. | 252/62.59 |
| 4,664,831 | 5/1987 | Hibst et al. | 252/62.59 |

*Primary Examiner*—Michael Lusignan
*Attorney, Agent, or Firm*—F. A. Iskander

[57] ABSTRACT

Doped co-precipitates of magnetite ($Fe_3O_4$) and $ACO_3$, wherein A is barium, are prepared by a simplified process. This process involves reacting together, in an aqueous medium containing dopant ions, a ferric compound, a ferrous compound, a barium compound and an alkali metal carbonate.

15 Claims, No Drawings

PROCESS FOR PREPARING SELECTED, DOPED MAGNETITE/CARBONATE CO-PRECIPITATES

This application is a continuation-in-part of co-pending application Ser. No. 923,063, filed Oct. 24, 1986, the entire disclosure of which is incorporated by reference herein.

This invention relates to a process for making certain doped co-precipitates of magnetite ($Fe_3O_4$) and alkaline earth carbonate ($ACO_3$ wherein A is barium or strontium). The invention also relates to a select product of this process, which product is useful as an intermediate in the manufacture of doped hexaferrite magnetic particles.

Co-precipitated magnetite/barium carbonate mixtures are known to be useful in the production of barium ferrite powder, the latter in turn being useful in making composite plastic-ferrite magnets. See for example U.S. Pat. No. 4,120,807. According to this patent, the co-precipitated mixture is prepared by mixing a solution of $FeCl_2$ and $BaCl_2$ containing equimolar $Fe^{2+}$ and $Ba^{2+}$ ions with a solution of equimolarly mixed alkalis such as NaOH or KOH and $Na_2CO_3$. Air is then bubbled into the mixed solution which is maintained in agitation and at a specified range of temperature and pH. By this technique, the patent states, the oxidation of the precipitated product, particularly the oxidation of $Fe^{2+}$ to $Fe^{3+}$, is effected; and when some of the $Fe^{2+}$ ions are so oxidized, $Fe(OH)_2$ and $Fe(OH)_3$ react with each other to form $Fe_3O_4$, the latter co-precipitating with $BaCO_3$ which is simultaneously formed in the solution.

It is also generally well-known in the art that doped barium and strontium hexaferrite particles can be used in a wide variety of magnetic recording media applications, particularly high density recording tapes. The must commonly used dopants in such materials are cobalt and titanium, and these are preferably used in equi-molar proportions. See for example U.S. Pat. Nos. 4,341,648 and No. 4,585,568.

Now a simple and highly efficient process has been found for preparing a doped co-precipitate of $Fe_3O_4$/$ACO_3$, wherein A is barium or strontium. According to the invention, this co-precipitate is prepared by reacting together, in an aqueous solution containing the requisite dopant ions, a ferric compcund, a ferrous compound, a barium or strontium compound and an alkali metal carbonate.

Further according to the invention, it has been found that by practicing the preferred embodiments of the process disclosed herein, a select, new composition-of-matter is obtained which is highly useful as an intermediate in making doped alkaline earth ferrite particles having excellent properties or attributes for use in the production of high quality magnetic recording tapes.

It is to be noted that magnetite is sometimes referred to in the art as a combination of FeO and $Fe_2O_3$. Accordingly, as used throughout the specification and claims hereof, the term "magnetite" and the formula "$Fe_3O_4$" are intended to include such $FeO/Fe_2O_3$ combination.

More in detail, any water-soluble ferric compound, ferrous compound and barium or strontium compound may be used in carrying out the reaction of the invention, provided that the anion of each of these compounds does not interfere in any way with the co-precipitation reaction nor materially alter the nature, chemistry or physical characteristics of the resulting co-precipitate. The same statement applies with respect to the anion of the compounds used to provide the dopant ions. Preferably two dopants are used, one selected from the group consisting of cobalt, zinc and nickel and the other selected from titanium and ruthenium.

Illustratively each of the ferric compound, ferrous compound, barium or strontium compound, and dopant compounds can be a halide, nitrate or acetate salt. However, in each instance, it is preferable to use the halide salts, e.g., chloride, bromide, iodide or fluoride, including the hydrates thereof. Within this small group, the chlorides and bromides are especially preferred, with the chlorides being most preferred.

The other reactant which is required in the preparation of the doped co-precipitate of the invention is an alkali metal carbonate, the preferred alkali metals being sodium and potassium.

In accordance with the most preferred embodiments of the invention, an alkali metal hydroxide is also included in the reaction mixture. As with the carbonate reactant, the cation of the hydroxide can be any alkali metal, but sodium and potassium are preferred.

Any suitable procedure may be used to bring the various reactants together to effectuate the co-precipitation reaction. For example, an aqueous solution can be prepared containing the desired proportions of ferric compound, ferrous compound barium or strontium compound and the dopant compounds. Then the required amount of the alkali metal carbonate (and alkali metal hydroxide, if such is used) is added to the solution. Preferably an aqueous solution of the alkali metal carbonate, and optionally the alkali metal hydroxide, is prepared separately and then this is mixed with the iron-dopant solution.

The co-precipitation reaction is preferably carried out at a temperature within the range of about 40° C. to about 120° C., more preferably about 60°–110° C. The most preferred reaction temperature range is about 75°–105° C. It is also preferable to maintain the reaction mixture at a pH above about 10 and more preferably about 10.5 to about 13.5.

To further describe and illustrate the process of the invention, the following details are provided for use in practicing the preferred embodiments hereof. These preferred embodiments include (1) The use of chloride salts in the case of each of the ferric compound, the ferrous compound, the barium or strontium compound and the dopants.
(2) The use of barium chloride in preference over strontium chloride.
(3) The selection of cobalt and titanium, as the dopants, supplied to the reaction mixture in the form of cobalt chloride ($CoCl_2$) and titanium chloride ($TiCl_3$).
(4) The use of both sodium carbonate and sodium hydroxide in carrying out the co-precipitation reaction.

An aqueous solution of ferric chloride, ferrous chloride, barium chloride, cobalt chloride and titanium chloride is prepared. The preferred and most preferred percent concentrations by weight of those reactants in the aqueous solution are indicated below:

| Component | Preferred Range | More Preferred Range |
|---|---|---|
| $BaCl_2$ | 0.21–3.34% | 0.47–2.29% |
| $FeCl_2$ | 0.43–6.90 | 0.97–4.75 |

-continued

| Component | Preferred Range | More Preferred Range |
|---|---|---|
| FeCl$_3$ | 1.10–17.67 | 2.48–12.15 |
| CoCl$_2$ | 0.12–1.87 | 0.26–1.29 |
| TiCl$_3$ | 0.14–2.22 | 0.31–1.53 |
| Water | 98–68 | 95.5–78 |

As will become apparent from the equation provided hereinbelow, it is preferable to use the cobalt and titanium chlorides in equi-molar proportions. Such proportions may range from about 0.2 to about 1.2 moles per mole of barium chloride.

A second aqueous solution of the alkali metal carbonate and the alkali metal hydroxide is prepared, using a total amount of alkali which is in excess of that needed to precipitate all of the solids from the first solution. The pH of this alkaline solution will be above 10 and usually within the range of about 10.5–13.5. Alternatively the preparation of the alkaline solution may be carried out by pumping $CO_2$ gas into an aqueous solution containing a high concentration of NaOH.

To facilitate the co-precipitation reaction it is generally preferable to heat the alkaline solution to about 40°–100° C. before it is mixed with the first solution (i.e., the iron-barium-dopant solution). In combining and mixing together the two solutions, suitable volume ratios of the first to the second solution range from about 1:5 to about 1:0.5. Any suitable means may be used to thoroughly mix the two solutions together and to maintain the temperature of the mixture within the ranges of about 40°–120° C., more preferably 60°–100° C. For example, a steam-jacketed, stirred tank reactor may be used in which the iron-barium-dopant solutiOn is first placed, followed by the addition thereto of the alkaline Na$_2$CO$_3$/NaOH solution.

The over-all reaction and product thereof according to the invention are summarized in the following equation in which the symbol "y" represents the molar amount of each of the cobalt chloride and titanium chloride used, which molar amount, as indicated above, ranges from about 0.2 to about 1.2, preferably about 0.4–1.0.

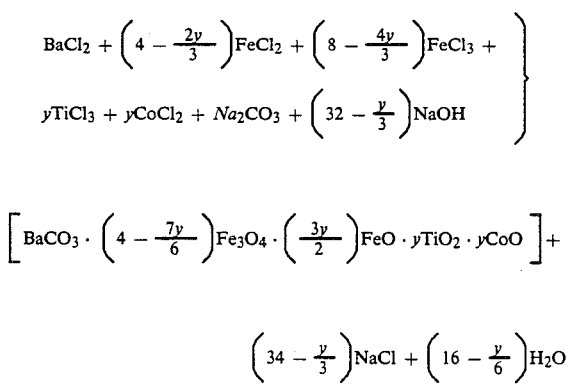

The above equation illustrates the most preferred embodiments of the invention wherein, per every 1 to 1.2 moles (e.g. about 1.05 moles) of barium halide, there are employed about $$\left(8 - \frac{4y}{3}\right) \text{moles}$$

of ferric halide, about $$\left(4 - \frac{2y}{3}\right) \text{moles}$$

of ferrous halide, and about y moles each of the titanium halide and the cobalt halide, the value of the symbol "y" being as defined above. Moreover, the alkali metal carbonate is used in an amount which is at least equal to, and preferably in excess of, the stoichiometric amount required to react with the barium halide, resulting in the formation of the barium carbonate precipitate.

The precipitated product (shown in brackets in the above equation) is then separated from the aqueous medium and recovered using such conventional means as a centrifuge or a magnetic roller separator. It is not known how the magnetite and the barium carbonate are combined together, but that they do combine is confirmed by the fact that it is not possible to separate them from one another by magnetic or gravitational techniques.

After separation and recovery, the solid product is preferably washed with water to reduce or wash away any residual alkalinity. The resulting product can then be used as a precursor in the manufacture of magnetic particles (i.e., doped barium hexaferrite) which in turn can be utilized in the manufacture of magnetic recording media.

In accordance with the invention, it has been found that a select product having improved physical properties is obtained using the most preferred process parameters summarized above. As noted in the foregoing equation, that product is identified by the molecular formula $$BaCO_3 \cdot \left(4 - \frac{7y}{6}\right)Fe_3O_4 \cdot \left(\frac{3y}{2}\right)FeO \cdot yTiO_2 \cdot yCoO$$

wherein y is from about 0.4 to about 1.0, preferably about 0.7–0.9.

By virtue of the highly selective molar ratios of the various components to one another, this product has been found to have unique attributes when used as a precursor for the manufacture of doped barium hexaferrite magnetic particles. For example, the resulting particles have excellent coercivity (Hc) and specific magnetization values. As such they would be eminently suited for use in making high quality magnetic recording tapes.

The following example is provided to further illustrate the invention. In this example, all parts and percentages are by weight unless otherwise specified.

EXAMPLE

A cobalt- and titanium-doped Fe$_3$O$_4$/BaCO$_3$ coprecipitate product was formed on a large scale using a 30 liter continuous stirred tank reactor (CSTR) according to the following steps:

First, an iron-dopant feed solution was prepared by mixing the following solids and aqueous solutions into deionized water:

| Iron-Dopant Components | | | |
|---|---|---|---|
| Component | Total Kg | Wt. % Assay | Reactant Moles |
| $FeCl_3$ Solution | 43.540 | 38.30 | 102.80 |
| $FeCl_2$ Solution | 22.350 | 29.15 | 51.40 |
| $CoCl_2.6H_2O$ Crystal | 3.069 | — | 12.90 |
| $TiCl_3$ Solution | 7.770 | 25.60 | 12.90 |
| $BaCl_2.2H_2O$ Crystal (2% Excess $BaCl_2$) | 3.737 | — | 15.30 |

These components were diluted and mixed with sufficient deionized water to form a total solution volume of 160 gallons (605.6 liters).

An aqueous $NaOH/Na_2CO_3$ alkaline solution was also prepared by mixing the following components in deionized water:

| Aqueous Alkaline Components | | | |
|---|---|---|---|
| Component | Total Kg | Wt. % Assay | Reactant Moles |
| 50% NaOH Solution | 85.18 | 50 | 1064.75 |
| $Na_2CO_3$ Anhydrous | 12.81 | — | 120.84 |

These components were diluted and mixed with deionized water to form a total solution volume of 450 gallons (1703 liters).

After its formation, the aqueous alkaline solution was heated to a temperature of 90°–95° C. using a steam heated shell and tube heat exchanger. The hot (90°–95° C.) alkaline solution and room temperature iron-dopant solution (~25° C.) were then pumped into a steam jacketed continuous stirred tank reactor with overflow at the following conditions:

| | |
|---|---|
| alkaline flowrate: | 1.33 GPM (5.03 LPM) |
| iron-dopant flowrate: | 0.68 GPM (2.57 LPM) |
| agitator RPM: | 1100 |
| reactor temperature: | 96–98° C. |
| reactor volume: | 7.92 gallons (30 liters) |
| reactor residence time: | 4 minutes |
| baffles: | 4 |
| agitator type: | one 5.9 inch Lightning A-310 impeller |

This CSTR reactor was designed to insure adequate mixing of the two solution streams to form the magnetic co-precipitate particles. The alkaline solution flowed into the reactor by an upflow from the bottom. The iron-dopant solution was introduced into the reactor through pin-holes in a circular sparger ring positioned below the impeller. The reactor overflow was positioned near the top of the reactor.

The continuous output from the reactor overflow was sent into a recirculating quench tank to cool this output reactor stream to below about 40° C. and thereby reduce any further precursor particle growth. Cooling was done using a water cooled heat exchanger.

The cooled solution was then passed from the quench tank to a settling tank. The co-precipitate particles settled to the bottom and a portion of the clear alkaline supernatant was decanted to form a slurry of about 100 gallons. The slurry was then washed with an additional 300 gallons of deionized water.

The washed slurry was then centrifuged using a 12 inch imperforate bowl basket centrifuge with a G-force of about 1500. This step separated out to 95 pounds of a wet cake (33% by weight total precursor solids having .06% by weight total alkali impurities). Analysis of the mother liquor showed only trace amounts of metal thereby confirming that substantially all of the metallic components of the reactants were precipitated.

Elemental analysis of the solids confirmed the presence of titanium and cobalt in the expected levels. Analysis by x-ray diffraction showed a primarily two-phase component mixture made up of $Fe_3O_4$ and $BaCO_3$. No other species of barium were found in this product, which confirms the fact that the cobalt and titanium (believed to be in the form of the oxides thereof) were incorporated in the magnetite/barium carbonate structure.

What is claimed is:

1. A process for preparing a doped co-precipitate of $Fe_3O_4/ACO_3$ wherein A is barium or strontium, said co-precipitate containing a first dopant selected from cobalt, zinc and nickel and a second dopant selected from titanium and ruthenium, which process comprises
reacting together, at a temperature of 40° to 120° C. in an aqueous medium containing effective amounts of ions of said two dopants, ferric halide, ferrous halide, barium or strontium halide and an alkali metal carbonate.

2. The process of claim 1 wherein said dopants are cobalt and titanium.

3. The process of claim 2 wherein said dopants are supplied to the reaction medium in the form of halide salts, and said reaction medium includes an alkali metal hydroxide.

4. The process of claim 4 wherein the halogen in all said halides is chlorine or bromine.

5. The process of claim 4 wherein said reaction is carried out at a temperature of about 60° to about 110° C.

6. The process of claim 5 wherein the reaction medium is maintained at a pH of about 10.5 to about 13.5.

7. The process of claim 6 wherein the alkali metal in said carbonate and said hydroxide is sodium or potassium.

8. The process of claim 7 wherein barium halide is used and correspondingly A is barium.

9. The process of claim 8 wherein said halides of cobalt and titanium are used in equi-molar proportions ranging from about 0.4 to about 1.0 mole per every mole of said barium halide.

10. The process of claim 9 wherein said alkali metal carbonate is used in a proportion at least equal to the stoichiometric amount required to react with said barium or strontium halide.

11. The process of claim 10 wherein said reaction is carried out in steps comprising
    (a) forming a first aqueous solution containing said ferric halide, ferrous halide, barium halide, cobalt halide and titanium halide;
    (b) forming a second aqueous solution of said alkali metal carbonate and alkali metal hydroxide; and
    (c) mixing said first and second solutions together.

12. The process of claim 11 wherein per every 1 to 1.2 moles of said barium halide, there are employed about $$\left(8 - \frac{4y}{3}\right) \text{moles}$$

of said ferric halide; about $$\left(4 - \frac{2y}{3}\right) \text{moles}$$

of said ferrous halide; and y moles each of said cobalt halide and said titanium halide, the symbol "y" having a value from about 0.4 to about 1.0.

13. The process of claim 12 wherein said halogen is chlorine and said alkali metal is sodium.

14. A doped magnetite/barium carbonate composition of matter having the molecular formula

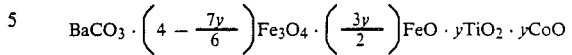

wherein y is from 0.4 to 1.0.

15. The composition of claim 14 wherein y is from 0.7 to 0.9.

* * * * *

UNITED STATES PATENT AND TRADEMARK OFFICE
CERTIFICATE OF CORRECTION

PATENT NO. : 4,780,232

DATED : October 25, 1988

INVENTOR(S) : Kaczur et al.

It is certified that error appears in the above—identified patent and that said Letters Patent is hereby corrected as shown below:

In column 6, at line 33 delete "process of claim 4" and insert instead --process of claim 3--.

Signed and Sealed this

Twelfth Day of May, 1992

Attest:

DOUGLAS B. COMER

*Attesting Officer*  *Acting Commissioner of Patents and Trademarks*